UNITED STATES PATENT OFFICE.

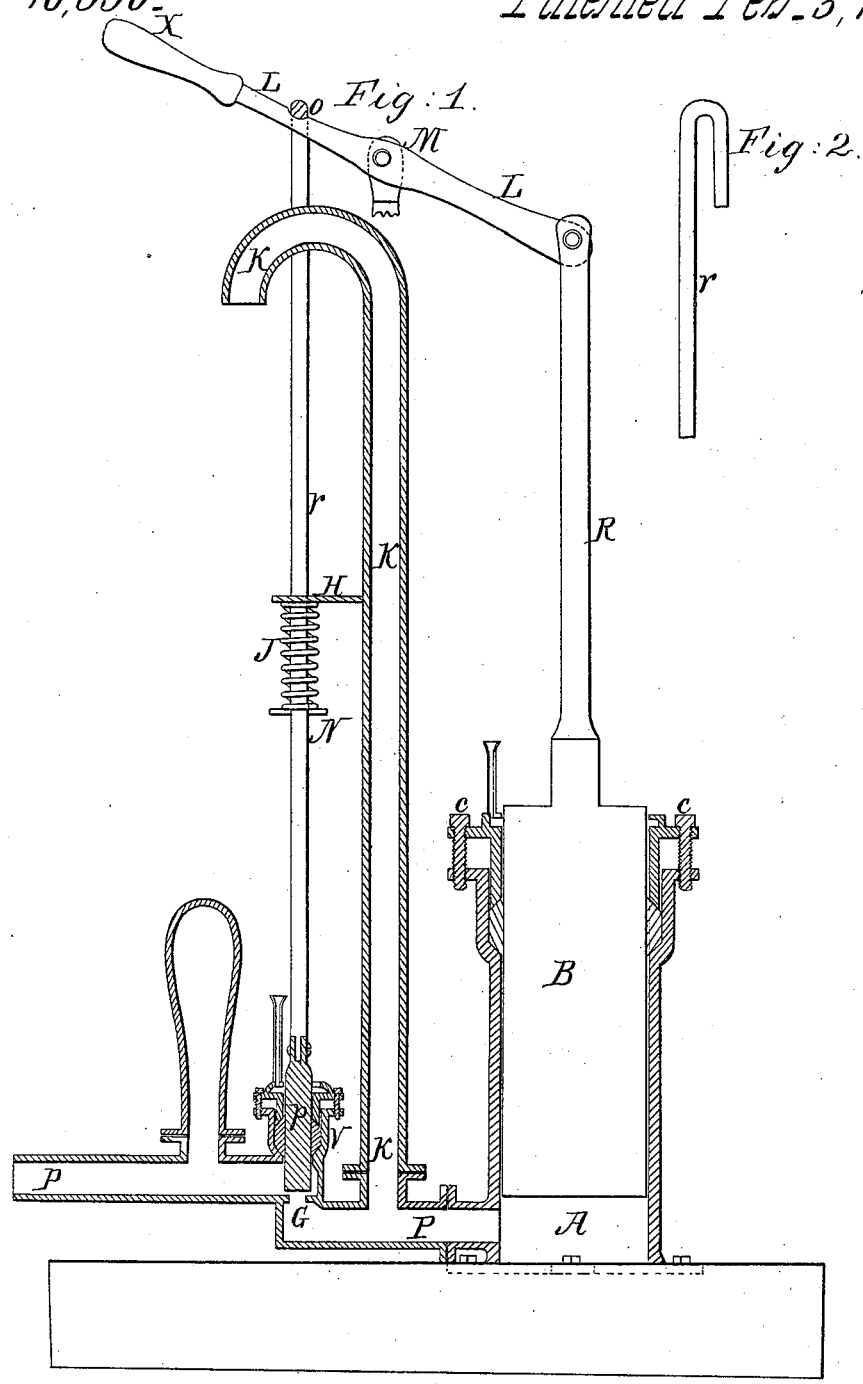

W. FIELDS AND S. GERHARD, OF WILMINGTON, DELAWARE.

HYDRANT.

Specification of Letters Patent No. 16,536, dated February 3, 1857.

*To all whom it may concern:*

Be it known that we, WILLIAM FIELDS and SALOMON GERHARD, both of Wilmington, in the county of Newcastle, in the State of Delaware, have invented new and useful Improvements in Hydrants; and we hereby declare that the following is a full and exact description thereof, reference being had to the accompanying drawing, in which—

Figure 1 represents a sectional view of our improved hydrant and Fig. 2 a detail of the plunger rod.

A is a cylinder, at or near the base of which terminates the branch pipe P conducting water from some main tank reservoir or other water collector located at a superior level, through the streets to houses or other establishments requiring its supply.

A plunger B working in the cylinder A, is carefully packed so as to exclude the access of air. The packing forms an important feature of our hydrant, as it secures its proper operation. The cylinder is constructed for that purpose of 2 parts: the body of the cylinder has an enlargement at the top into which a flange collar fits. The collar has its lower edge beveled off in a contrary direction to the bevel of the enlargement. Between the 2 bevel surfaces the packing material is placed which thus can be compressed and wedged toward the plunger by drawing the screws in bolts *c c* firmly together. A similar packing is applied to the valve *v* which is operated by a plunger *p* as hereinafter described. The collars or bolts of the cylinder and of the valve are furnished with an annular oil chamber and tube, for the proper lubrication of parts in friction. The branch pipe P which is inserted between the main pipe and the hydrant is so constructed as to contain the body of the valve, the seat G of the plunger *p*, an air chamber D, and a collar bearing the discharge pipe K, the whole being arranged as shown in the annexed drawing.

The seat G of the valve-plunger *p* consists of an annular and horizontal projection facing the underside of the plunger.

A lever, the fulcrum of which is fixed at M, is jointed on one end to the plunger or piston rod R in a permanent manner, is so arranged as to operate the valve plunger rod *r* at each elevation and at the required moment, the latter being bent as shown in the side view of Fig. 2, and fits into a notch upon the lever. The rod *r* is furnished with a stud or cross pin V which holds a spiral spring *j* between itself and a stop attached to the discharge pipe or to any other fixed object in its vicinity. This being a detailed description of the parts of the hydrant, we now proceed to describe its *modus operandi*.

The water in the main pipe coming from a higher level, has a tendency to rise wherever and whenever it is permitted to issue. In dwelling houses or other buildings where water is used, pipes are led to the different stories and a stopcock is employed for the continuance or discontinuance of the supply of water. In the old plan the water remaining in the pipe, was liable to freeze, intercepting the supply of water or causing the pipe to burst, by thawing.

Other devices have been used such as the letting out of the water from the discharge pipe, which although remedied the defect above mentioned, created a new evil arising from the waste of the water, the injury to foundation and inconvenience from dampness in the building.

Hydrants have been made to suck the waste water up (into some reservoir) which remains in the pipe after it was closed. These never worked satisfactorily as the least neglect in the operation caused the same effects which were sought to avoid. The valves moreover worked either suddenly, which caused the bursting of pipes, or leaked.

We have succeeded in constructing a hydrant that can be operated without risk by any person not acquainted with the mechanism of the apparatus, as the latter is so arranged as to control its own action.

The operator on lifting the handle X depresses the plunger B in the cylinder A; the waste water contained therein is caused to rush out through the discharge pipe K when the lever L is elevated as high as shown in the annexed drawing and the plunger B having expelled almost all the water contained in the cylinder the lever will now lift the valve or plunger *p* and allow fresh water to flow up through the discharge pipe K. As soon as the supply of water is desired to be stopped the lever L is let down, the valve plunger is then immediately forced down by the power of the spring J, thus stopping the supply of water. The sudden stopping of the water may cause the pipe to burst, we therefore apply an air reservoir for the purpose of deadening the stroke of the water ram. The waste water remaining in the pipe is drawn into the cylinder by the upward motion of the plunger B.

From the above description it will be seen that it is of paramount importance to have first, a proper valve not liable to be ground out by sand or other intervening material. Secondly a good and substantial packing against water and air, thirdly, arranged the whole apparatus in such a manner, that it be self-controlling and not liable to get out of order.

We therefore claim—

1. The combination of the lever L with the rods R and r operating the plungers B and p in the manner herein specified.

2. We also claim the plunger valve V, when arranged in relation to the bent pipe P and constructed in the manner described and when operated in connection with the plunger B and not otherwise, substantially as herein set forth.

In testimony whereof we have signed our names to this specification before two subscribing witnesses.

WILLIAM FIELDS.
SALOMON GERHARD.

Witnesses:
CHAS. EVERETT,
A. POLLAK.